US008434057B2

(12) United States Patent
Ashish et al.

(10) Patent No.: US 8,434,057 B2
(45) Date of Patent: Apr. 30, 2013

(54) OPTIMIZED IMPLEMENTATION OF BREAKPOINT IN JAVA DEBUGGER AGENT

(75) Inventors: Kumar Ashish, Bangalore (IN); Kiran Deshmukh, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 288 days.

(21) Appl. No.: 12/857,734

(22) Filed: Aug. 17, 2010

(65) Prior Publication Data

US 2012/0047486 A1    Feb. 23, 2012

(51) Int. Cl.
G06F 9/44    (2006.01)

(52) U.S. Cl.
USPC ........... 717/106; 717/124; 717/129; 717/127; 714/38; 709/224

(58) Field of Classification Search .................. 717/106, 717/129, 124, 127; 714/38
See application file for complete search history.

(56) References Cited

U.S. PATENT DOCUMENTS

| | | | |
|---|---|---|---|
| 6,463,578 B1 | 10/2002 | Johnson | |
| 6,637,024 B1 | 10/2003 | Johnson et al. | |
| 6,850,953 B1 * | 2/2005 | Deshpande et al. | 1/1 |
| 6,895,575 B2 | 5/2005 | Dharamshi | |
| 6,934,886 B2 | 8/2005 | Ok | |
| 6,966,057 B2 * | 11/2005 | Lueh | 717/158 |
| 6,986,124 B1 * | 1/2006 | Field et al. | 717/124 |
| 7,353,427 B2 * | 4/2008 | Bates et al. | 714/38.12 |
| 7,555,744 B2 | 6/2009 | Chkodrov et al. | |
| 2004/0128655 A1 * | 7/2004 | Bates et al. | 717/129 |
| 2005/0216895 A1 * | 9/2005 | Tran | 717/127 |
| 2006/0064677 A1 * | 3/2006 | Bickson et al. | 717/124 |
| 2008/0115119 A1 * | 5/2008 | Lagergren | 717/148 |
| 2008/0244547 A1 * | 10/2008 | Wintergerst et al. | 717/158 |
| 2008/0250397 A1 * | 10/2008 | Dahms et al. | 717/129 |
| 2009/0037892 A1 | 2/2009 | Luedde | |

FOREIGN PATENT DOCUMENTS

| | | | |
|---|---|---|---|
| JP | 2039332 | A | 2/1990 |
| JP | 2135545 | A | 5/1990 |
| JP | 4155540 | A | 5/1992 |
| JP | 4348436 | A | 12/1992 |
| JP | 6004346 | A | 1/1994 |
| WO | WO 2006087922 | A1 | 8/2006 |

OTHER PUBLICATIONS

A Short User Manual for dbx, http://www.cs.uiowa.edu/~rus/Courses/SysSoft/dbx.pdf, downloaded Dec. 7, 2010, 3 pgs.

(Continued)

Primary Examiner — Vanel Frenel
(74) Attorney, Agent, or Firm — Kilpatrick Townsend & Stockton LLP

(57) ABSTRACT

Embodiments of the invention provide systems and methods for optimizing handling of breakpoints in a debugger agent. Embodiments generate an additional modified bytecode copy that includes location indexes associated with breakpoint requests at the breakpoint locations. The location indexes may correspond to a location in a data structure in which the breakpoint information (e.g., request identifier and associated location information) is stored. The location index identified by the additional bytecode copy for a breakpoint may then be used to directly access the appropriate location in the data structure for generating a desired reply packet. Thus, the location index may effectively allow the debugger agent to generate the reply packet without searching through a complex data structure for the relevant request information.

20 Claims, 7 Drawing Sheets

OTHER PUBLICATIONS

Breakpoint, http://info.krc.karelia.ru/java/docs/guide/jvmdi/jvmdi/html#SetBreakpoint, downloaded Nov. 29, 2010, pp. 1-49.

Continuing and Stepping—Debugging with DGB, http://sourceware.org/gdb/current/onlinedocs/gdb/Continuing-and-Stepping.html, downloaded Dec. 7, 2010, 5 pgs.

EGL Debugger Commands, http://publib.boulder.ibm.com/infocenter/rbdhelp/v7r5m0/index.jsp?topic=/com.ibm.egl.pg.doc/topics/pegl_core_debug_commands_cpt.html, downloaded Dec. 7, 2010, 407 pgs.

Gallardo, David, "Debugging a Java Program with Eclipse," http://www.developer.com/article.php/2221711, Jun. 13, 2003, 7 pages.

Java Platform Debugger Architecture, http://java.sun.com/j2se/1.4.2/docs/guide/jpda/javadt.html, 2010, pp. 1-3.

JDebugTool Graphical Java Debugger, http://www.debugtools.com/, downloaded Nov. 29, 2010, pp. 1-2.

JProbe memory debugger, http://www.tan.co.jp/JProbe/MemoryDebugger.aspx, 2010.

JSwat Java Debugger, : http://code.google.com/p/jswat/, 2010, pp. 1-2.

Judd, Christopher, "Debugging in JBuilder," http://www.juddsolutions.com/debug.html, 2002, pp. 1-7.

Oliver et al., Rhino JavaScript Debugger, http://www.mozilla.org/rhino/debugger.html, downloaded Dec. 7, 2010, 4 pgs.

Python Software Foundation, The Python Debugger, http://docs.python.org/library/pdb.html, 1990-2010, 8 pages.

SunMicrosystems, Inc., JavaTM Virtual Machine Debug Interface Reference, http://info.krc.karelia.ru/java/docs/guide/jvmdi/jvmdi.html#SetBreakpoint, 1996-1998, 59 pgs.

The MathWorks, Inc., Debugging: Programming Tips, http://www.mathworks.com/access/helpdesk/help/techdoc/matlab_prog/f10-60570.html, 1984-2010, 3 pgs.

The Mathworks, Inc., Set Breakpoints—Matlab, http://www.mathworks.com/access/helpdesk/help/techdoc/ref/dbstop.html, 1984-2010, 5 pgs.

Winchester, Joe, "IBM WebSphere Developer Technical Journal: Debugging Java code running inside WebSphere Application Server," http://www.ibm.com/developerworks/websphere/techjournal/0110_winchester/winchester.html#olt, Oct. 15, 2001, pp. 1-18.

* cited by examiner

OPTIMIZED IMPLEMENTATION OF BREAKPOINT IN JAVA DEBUGGER AGENT

BACKGROUND

Embodiments of the present invention relate generally to debugging agents, and, more particularly, to breakpoint handling in Java™ debugging agents.

When debugging a software application, it is often desirable to set breakpoints to cause a debugger agent to stop at a predefined location for debugging purposes. In many typical Java™ debuggers, upon receiving a breakpoint request, the debugger agent assigns a request identifier and associates certain relevant information (e.g., location information, including a class identifier, a method identifier, a method offset, etc.) with the breakpoint request in a data structure. When the debugger agent runs the program for debugging, a copy of the program bytecode may be made, in which the source bytecode at each breakpoint location is replaced by a special breakpoint opcode. The breakpoint opcode in the modified bytecode copy may be used by the debugger agent to detect that a breakpoint is reached and to inform a debugger front-end (e.g., and thereby inform the programmer) that the breakpoint has been reached.

Typically, when the breakpoint opcode is reached by the debugger agent, the debugger agent supplies a special function with the current program counter, which is used to search through the data structure in which breakpoint information is stored to find the associated request identifier. Once the appropriate request identifier has been located, a reply packet may be generated for passing desired information to the requestor (e.g., the programmer) at the debugger front-end. Notably, the data structure may be complex and/or large in many cases, such that locating the appropriate request identifier may be computationally intense. Thus, it may be inefficient each time a breakpoint is encountered to search through the complex data structure as a function of the program counter to find the relevant information for generating the reply packet.

BRIEF SUMMARY

Among other things, systems and methods are described for optimizing handling of breakpoints in a Java™ debugger agent. Embodiments generate an additional modified bytecode copy that includes location indexes associated with breakpoint requests at the breakpoint locations. The location indexes may correspond to a location in a data structure in which the breakpoint information (e.g., request identifier and associated location information) is stored. The location index identified by the additional bytecode copy for a breakpoint may then be used to directly access the appropriate location in the data structure for generating a desired reply packet. Thus, the location index may effectively allow the debugger agent to generate the reply packet without searching through a complex data structure for the relevant request information.

According to one set of embodiments, a method is provided for implementing breakpoints in a computer-implemented debugger environment having a front-end system and a back-end system. The method includes receiving a set of breakpoint requests at the back-end system from the front-end system, each breakpoint request indicating a request for setting a breakpoint at a program location in a source bytecode listing having a set of source opcodes stored in a bytecode data store; assigning a request identifier for each breakpoint request using the back-end system; storing, in a breakpoint store communicatively coupled with the back-end system, a set of request objects for each breakpoint request in association with the corresponding request identifier; identifying, using the back-end system, for each breakpoint request, a locator indicating a location in the breakpoint store at which the corresponding request objects are stored in the breakpoint store; generating a first modified bytecode copy using the back-end system by locating source opcodes in the source bytecode listing at the program locations corresponding to the breakpoint requests and replacing the located source opcodes in the first modified bytecode copy with breakpoint opcodes; generating a second modified bytecode copy using the back-end system by replacing the located source opcodes in the second modified bytecode copy with the locator associated with each corresponding breakpoint request; and maintaining the first modified bytecode copy and the second modified bytecode copy in the bytecode data store.

According to another set of embodiments, another method is provided for handling breakpoints in a computer-implemented debugger environment having a front-end system and a back-end system. The method includes identifying, using the back-end system, a program location corresponding to a breakpoint opcode encountered during execution of a first modified bytecode copy by the back-end system, the first modified bytecode copy generated by locating a source opcode located in a source bytecode listing at the program location corresponding to a breakpoint request received from the front-end system and replacing the located source opcode in the first modified bytecode copy with the breakpoint opcode; retrieving a locator from a second modified bytecode copy, using the back-end system, according to the program location of the breakpoint opcode in the first modified bytecode copy, the second modified bytecode copy generated by the back-end system by locating the source opcode located in the source bytecode listing at the program location corresponding to the breakpoint request and replacing the located source opcode in the second modified bytecode copy with the locator, the locator corresponding to the breakpoint request; retrieving, using the back-end system, according to the locator, a set of request objects associated with the breakpoint request from a storage location in a breakpoint store corresponding to the locator, the breakpoint store being communicatively coupled with the back-end system; generating, using the back-end system, a reply packet corresponding to the breakpoint request and including the set of request objects; and communicating the reply packet from the back-end system to the front-end system.

According to yet another set of embodiments, a computer-implemented debugging system is provided. The system includes a bytecode storage subsystem, a front-end subsystem, and a back-end subsystem. The bytecode storage subsystem is configured to maintain a source bytecode listing, a first modified bytecode copy, and a second modified bytecode copy. The front-end subsystem is configured to provide a debugger interface through which a user makes a plurality of breakpoint requests, each indicating a request for setting a breakpoint at a program location in the source bytecode listing including a set of source opcodes.

The back-end subsystem is communicatively coupled with the front-end subsystem and the bytecode storage subsystem and configured to: receive the plurality of breakpoint requests from the front-end subsystem; assign a request identifier for each breakpoint request; store, in a breakpoint store communicatively coupled with the back-end subsystem, a set of request objects for each breakpoint request in association with the corresponding request identifier; identify, for each breakpoint request, a locator indicating a location in the breakpoint store at which the corresponding request objects are stored; generate the first modified bytecode copy in the bytecode storage subsystem by locating a source opcode located in the source bytecode listing at the program location corresponding to each breakpoint request and replacing the located source opcode in the first modified bytecode copy with a breakpoint opcode; and generate the second modified bytecode copy in the bytecode storage subsystem by locating the source opcode located in the source bytecode listing at the program location corresponding to each breakpoint request and replacing the located source opcode in the second modified bytecode copy with the locator corresponding to the breakpoint request.

In some of these embodiments, the back-end subsystem is further configured to: execute the first modified bytecode copy from the bytecode storage subsystem; identify, during execution of the first modified bytecode copy, the program location corresponding to an instance of the breakpoint opcode associated with one of the breakpoint requests; retrieve the locator from the second modified bytecode copy according to the program location of the instance of the breakpoint opcode; retrieve the set of request objects associated with the breakpoint request from the location in the breakpoint store as a function of the locator; generate a reply packet corresponding to the breakpoint request and including the retrieved set of request objects; and communicate the reply packet from the back-end system to the front-end system.

DETAILED DESCRIPTION

Figure 1:
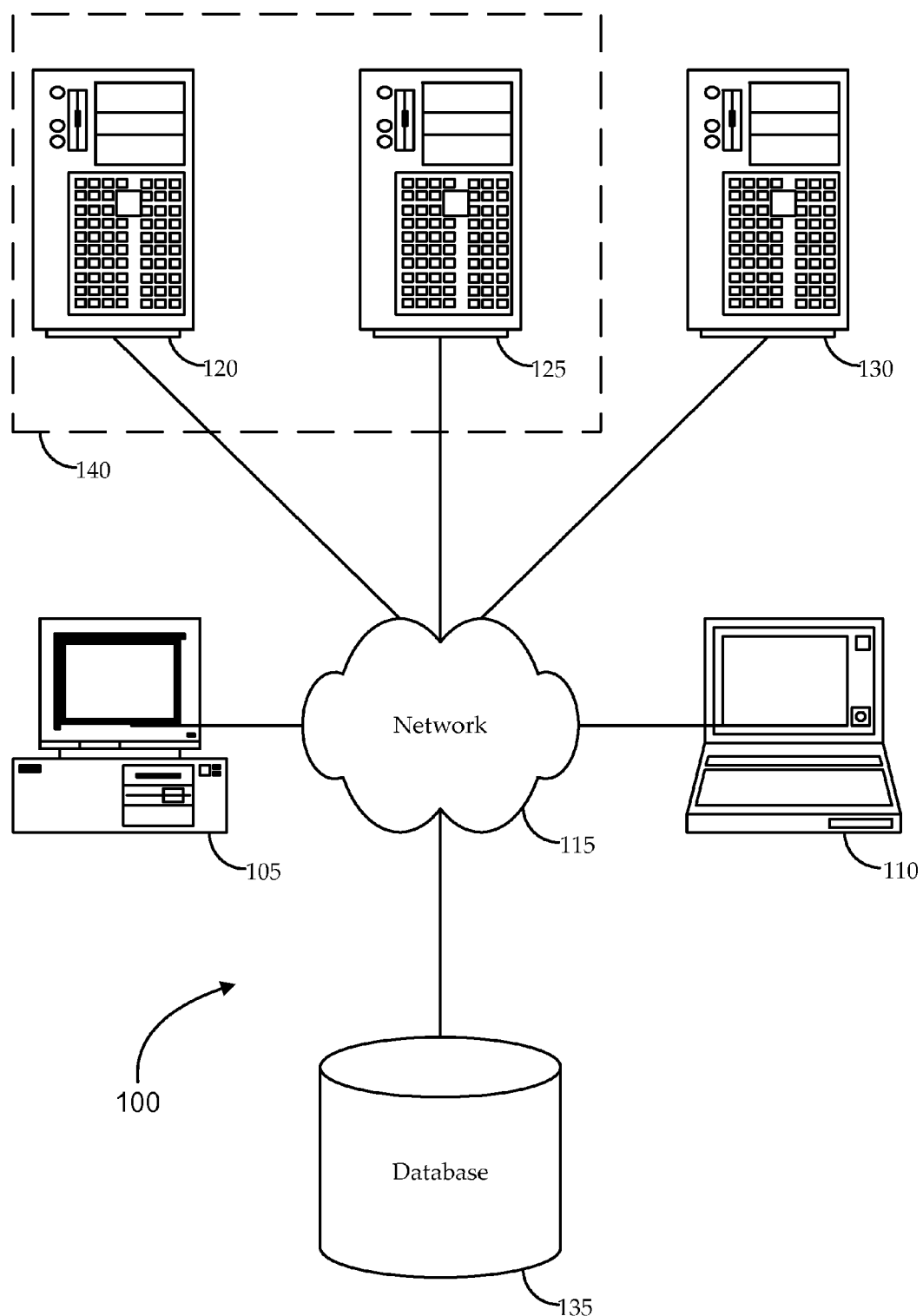
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems).

These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/ or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network (SAN) familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
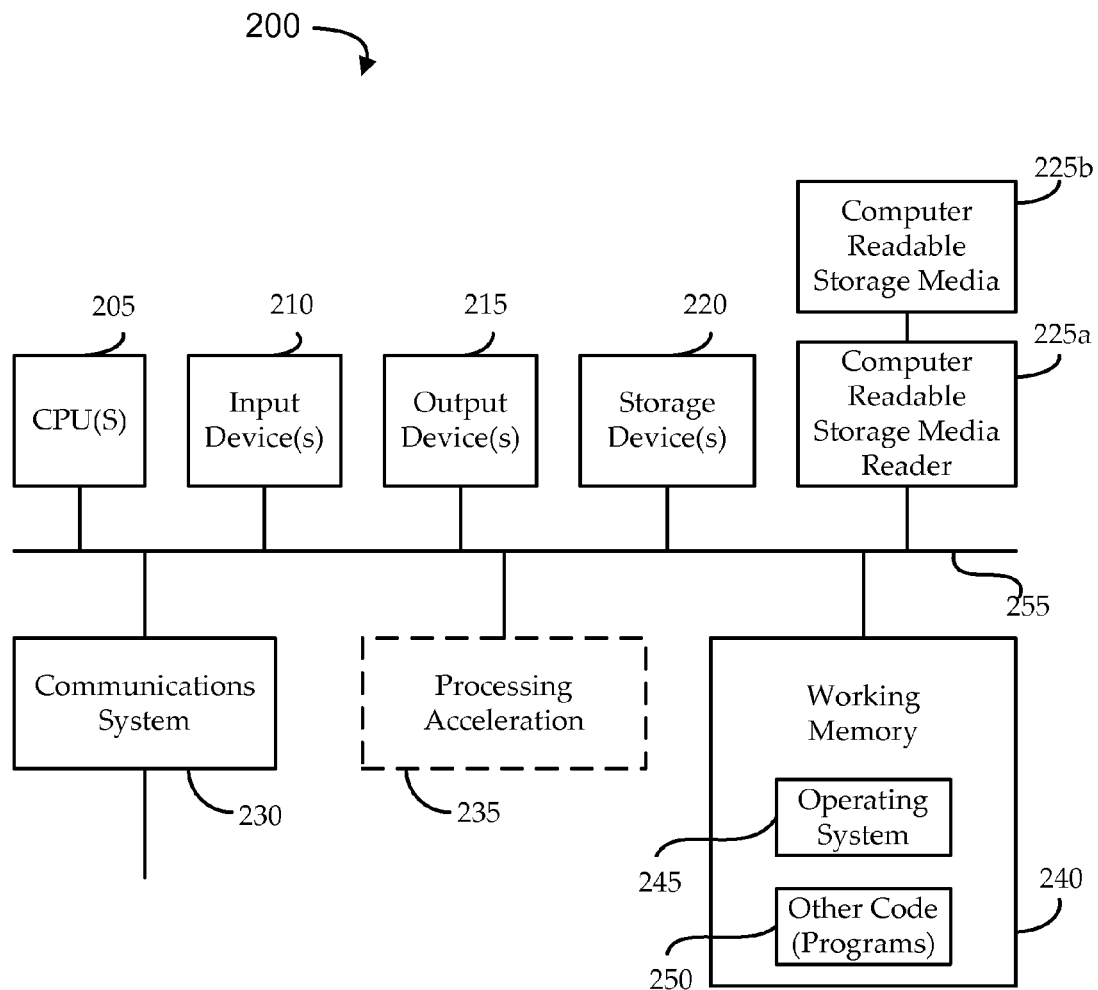
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory (RAM) and/or a read-only memory (ROM), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
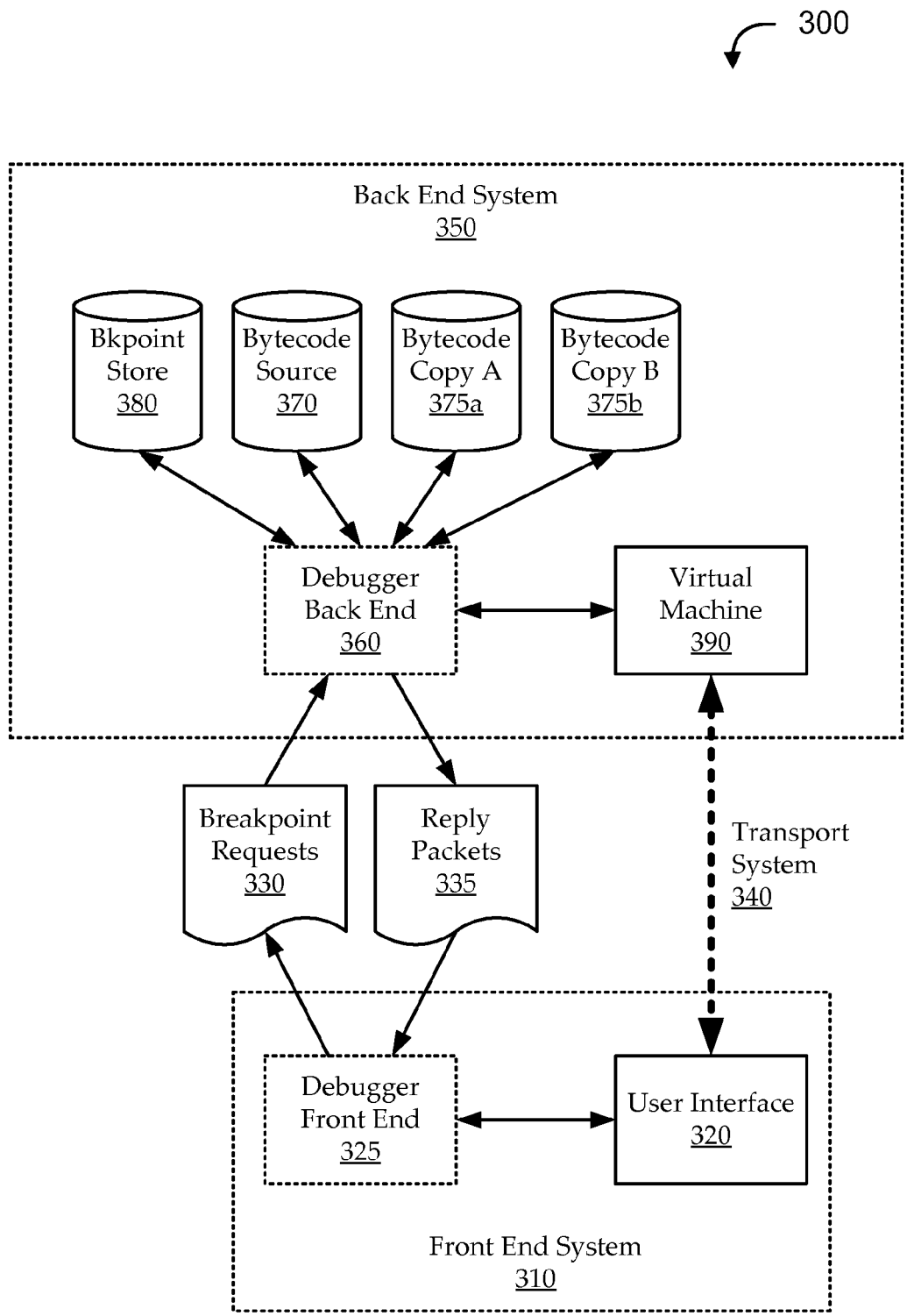
FIG. 3 shows a block diagram of an illustrative debugging environment, according to various embodiments.

FIG. 3 shows a block diagram of an illustrative debugging environment 300, according to various embodiments. The debugging environment 300 includes a front-end system 310 and a back-end system 350, in communication over a transport system 340. As illustrated, the front-end system 310 may include a user interface 320 and a debugger front-end 330. The back-end system 350 may include a virtual machine 390, a debugger back-end 360, and a number of data stores, including a bytecode source 370, modified bytecode copies 375, and a breakpoint store 380.

Embodiments of the debugging environment 300 are used for debugging a software application. The debugging environment 300 is described herein as a Java™ debugger for debugging Java™ bytecode. It will be appreciated that the novel functionality described herein may not be limited to Java™ environments; rather, other similar programming and/or debugging environments may be used without departing from the scope of the invention.

When debugging a software application (e.g., application, applet, function, etc.), it is often desirable to set breakpoints. The breakpoints may cause the debugger back-end 360 (e.g., debugger agent) to stop at a predefined location for debugging purposes. For example, it may be desirable for a programmer to see the value of variables at a particular point in a program where they would not normally be displayed to the user to determine whether a particular portion of the code (e.g., function) is operating as intended.

In many typical Java™ debuggers a breakpoint may be requested (e.g., illustrated as breakpoint requests 330) by a programmer. Upon receiving a breakpoint request 330, the debugger back-end 360 assigns a request identifier and associates certain relevant information about the breakpoint request 330 in a data structure, illustrated as the breakpoint store 380. For example, when the breakpoint request 330 is received, the debugger back-end 360 may store location information, including a class identifier, a method identifier, a method offset, etc., and associate the request identifier to the location information in the breakpoint store 380.

The debugger back-end 360 may have access to the program code as the bytecode source 370 (e.g., the original or a copy of the original bytecode). When the debugger back-end 360 runs the bytecode source 370 for debugging, a copy of the program bytecode may be made (illustrated as modified bytecode copy A 375a), in which the source bytecode at each breakpoint request 330 location is replaced by a special breakpoint opcode. The debugger back-end 360 may then run the modified bytecode from the modified bytecode copy A 375a, rather than running the original bytecode from the bytecode source 370. The breakpoint opcode in the modified bytecode copy A 375a may be used by the debugger back-end 360 to detect the breakpoint and to inform the debugger front-end 330 (e.g., and thereby inform the breakpoint requester) that the breakpoint has been reached.

For example, a Java Virtual Machine (JVM) (e.g., virtual machine 390) in the back-end system 350 may inform the debugger front-end 330 that a breakpoint associated with a particular breakpoint request 330 identifier has been reached. Typically, when the breakpoint opcode is reached by the debugger back-end 360 (e.g., using the virtual machine 390), the debugger back-end 360 calls the function associated with the breakpoint opcode and supplies the function with the current program counter. The function (e.g., and/or other functions) and the program counter may be used to generate a thread identifier and/or other location information. The location information may then be used to search through the breakpoint store 380 data structure to find the associated request identifier.

Once the appropriate request identifier has been located, a reply packet 335 may be generated for passing desired information to the requestor (e.g., the programmer) at the debugger front-end. The reply packet 335 may include the request identifier, the thread identifier, and the associated location information. For example, receipt of the reply packet 335 at the debugger front-end may cause relevant information for the breakpoint request 330 (e.g., current values of local variables) to be displayed to the debugger front-end 330 (e.g., to a debugger user interface).

Notably, the breakpoint store 380 data structure may be complex and/or large in many cases, such that locating the appropriate request identifier may be computationally intense. As described above, each time a breakpoint is encountered, the debugger back-end 360 may search through the complex breakpoint store 380 data structure as a function of the program counter to find the relevant information for generating the reply packet 335. This may be inefficient, particularly where many breakpoints are requested.

It will be appreciated that further processing by the debugger back-end 360 may involve executing the original (i.e., replaced) bytecode from the bytecode source 370. Thus, typically, the back-end system 350 is configured to store two versions of the bytecode—the bytecode source 370 and the modified bytecode copy A 375a. The modified bytecode copy A 375a is executed by the debugger and used to handle breakpoints, and the bytecode source 370 is maintained for continued execution of the bytecode replaced by the modified breakpoint opcode.

In some embodiments, the back-end system 350 is configured to store an additional modified bytecode copy B 375b. The bytecode source 370 maintains the original (i.e., unmodified) bytecode listing. The modified bytecode copy A 375a replaces bytecode at the breakpoint location with a modified breakpoint opcode for use by the debugger back-end 360. The modified bytecode copy B 375b replaces the bytecode at the breakpoint location with an index location representing the location in the breakpoint store 380 data structure where the information corresponding to the breakpoint request 330 is stored.

Embodiments of the debugger back-end 360 (e.g., as implemented by the virtual machine 390) are configured so that, when a breakpoint opcode is encountered during execution of the modified bytecode copy A 375a, the debugger back-end 360 finds the same location (e.g., corresponding with the program counter) in the modified bytecode copy B 375b. At that location in the modified bytecode copy B 375b, the bytecode has been modified to indicate an index location corresponding with the encountered breakpoint. Rather than searching through a complex breakpoint store 380 data structure (e.g., as a function of the program counter), the debugger back-end 360 can access the appropriate location in the data structure directly as a function of the index location.

According to the index location, the debugger back-end 360 may efficiently retrieve the request identifier and location information from the breakpoint store 380 corresponding to the encountered breakpoint. The information retrieved from the breakpoint store 380 may then be used to generate a reply packet 335. The reply packet 335 may then be communicated via the transport system 340 to the front-end system 310 for use by the breakpoint requester.

Figure 4A:
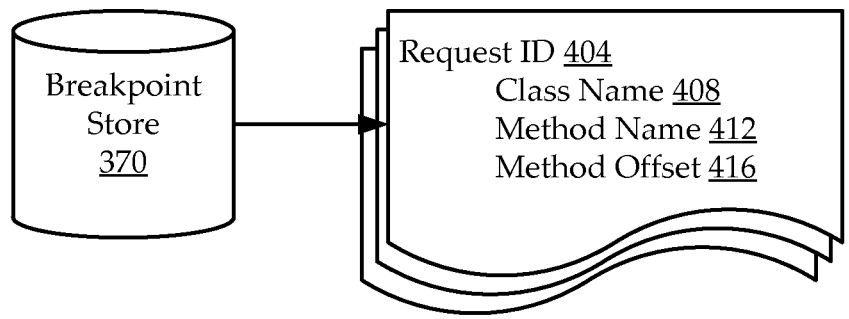
FIG. 4A shows an illustrative bytecode source data structure for use with a set of embodiments.
Figure 4B:
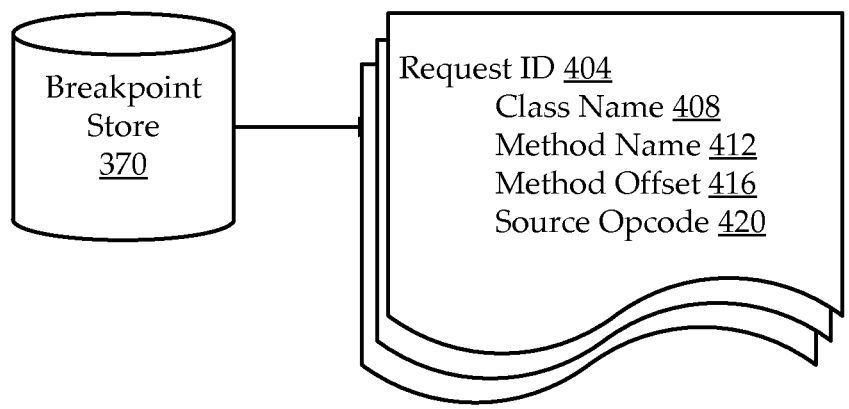
FIG. 4B shows another illustrative bytecode source data structure for use with another set of embodiments.

In some embodiments, the bytecode source 370 data structure is similar to the structure illustrated by FIGS. 4A and 4B. FIG. 4A shows an illustrative bytecode source 370 data structure for use with a set of embodiments. In one embodiment, the data structure includes a set of arrays, each array having 256 objects, and each object including a request identifier and location information. For example, the objects may be fixed with respect to a particular breakpoint request 330.

As illustrated, the breakpoint store 380 data structure may include a class name 408, a method name 412, a method offset 416, and/or any other useful location information. Also, the location information (e.g., objects) are associated with a particular request identifier 404 corresponding to a particular breakpoint request 330. When the breakpoint is requested, the location at which all the related information is stored in the data structure may be recorded and indicated, as described above, in the context of the modified bytecode copy B 375*b*.

It will be appreciated that indexing into a data structure, like the one illustrated in FIG. 4A, may facilitate efficient retrieval of the information needed to generate a reply packet 335 corresponding to the breakpoint request 330 identified by the breakpoint identifier. In some embodiments, it is desirable to include a thread identifier in the reply packet 335, and the thread identifier may not be accessible via the data structure. However, debugging functionality may allow retrieval of the thread identifier by using a standard function associated with the breakpoint opcode. As such, the thread identifier may be efficiently retrieved using the debugger breakpoint function, and all other information needed for generating the reply packet 335 may be efficiently retrieved by indexing the bytecode source 370 data structure according to the index location.

As discussed above, the virtual machine 390 (e.g., debugger back-end 360) may access the bytecode source 370 to retrieve the unmodified opcode from the breakpoint location for proper execution of the bytecode. As such, certain embodiments, such as those corresponding to the data structure of FIG. 4A, may use three versions of the bytecode—the original, unmodified bytecode source 370, and two modified bytecode copies 375. Of course, other embodiments may use other types of data structures.

FIG. 4B shows another illustrative bytecode source 370 data structure for use with another set of embodiments. Embodiments of the data structure of FIG. 4B may be similar or identical to that of FIG. 4A, except that the data structure of FIG. 4B is configured to store source opcode 420 information in association with the request identifier 404. This may obviate the need for maintaining storage of the bytecode source 370.

For example, in the embodiments described with reference to FIG. 4A, a breakpoint is requested at a particular breakpoint location within the bytecode listing. At that location, a source opcode 420 (e.g., or opcodes) from the original bytecode listing are represented in the bytecode source 370, the source opcode 420 is replaced by a modified breakpoint opcode in the modified bytecode copy A 375*a*, and the source opcode 420 is replaced by an index location in the modified bytecode copy B 375*b*. Using the data structure of FIG. 4B, the source opcode 420 from the breakpoint location is stored in the data structure in association with the request identifier 404.

When the debugger back-end 360 encounters the breakpoint opcode in the modified bytecode copy A 375*a*, it may find the corresponding index location according to the modified bytecode copy B 375*b*. The index location may then be used to find the request identifier 404 and associated location information in the breakpoint store 380 data structure. Using the same index location, the source opcode 420 may also be accessed as it is also stored in the data structure in association with the index location. The source opcode 420 may then be used directly from the breakpoint store 380, rather than using the bytecode source 370 to find the source opcode 420.

As such, it may be unnecessary to access the bytecode source 370 from the back-end system 350 once the modified bytecode copies 375 and the breakpoint store 380 have been generated. In some embodiments, the bytecode source 370 is removed from memory, for example, to save disk space. This may allow the debugger environment 300 to exploit efficiencies from indexing the breakpoint store 380 data structure without having to store three full version copies of the bytecode.

Figure 5A:
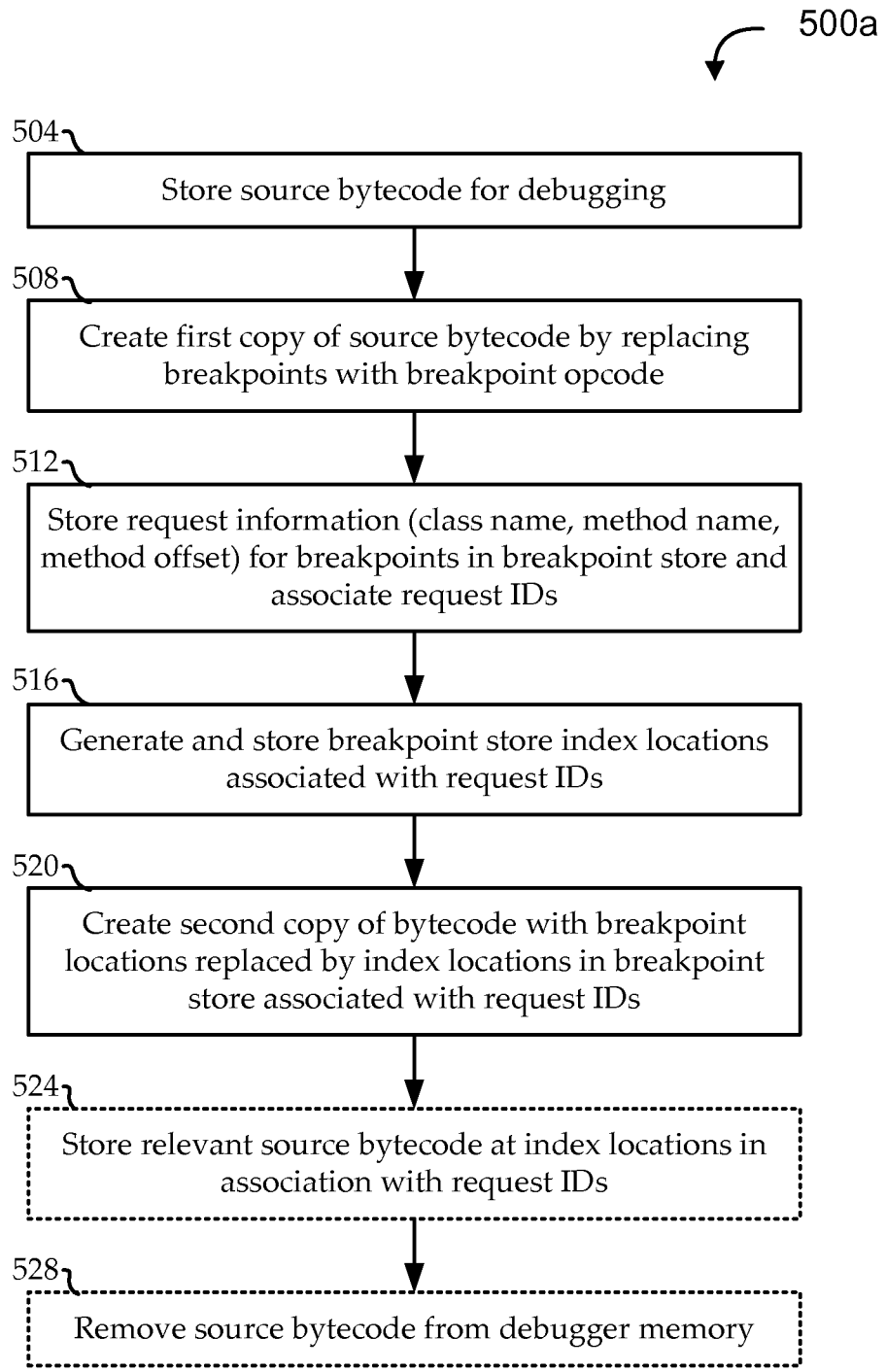
FIG. 5A shows a flow diagram for an illustrative method for implementing breakpoints in a debugger environment, according to various embodiments.

Turning to FIG. 5A, a flow diagram is shown for an illustrative method 500*a* for implementing breakpoints in a debugger environment, according to various embodiments. Embodiments of the method 500*a* begin at block 504 by storing source bytecode for debugging. For example, a copy of the original, unmodified bytecode listing is stored in a location accessible to the back-end system 350 (e.g., a debugger back-end 360 implemented as part of a virtual machine 390).

At block 508, a first copy of the source bytecode is generated by replacing source opcodes at breakpoint locations with a breakpoint opcode. Of course, the first copy may be different from the source bytecode in other ways, as well. At block 512, request information relating to the breakpoint request (e.g., class name, method name, method offset, etc.) is stored in a breakpoint store data structure and associated with a request identifier corresponding to the breakpoint request.

When the request information is stored in the data structure, an index location is recorded in association with the request identifier at block 516. At block 520, a second copy of the source bytecode may be created by replacing source opcodes at breakpoint locations with the index locations associated with request identifier corresponding to the breakpoint request. As described above, the index locations may be used to directly access relevant location information for the breakpoint request without searching through a complex data structure.

Figure 5B:
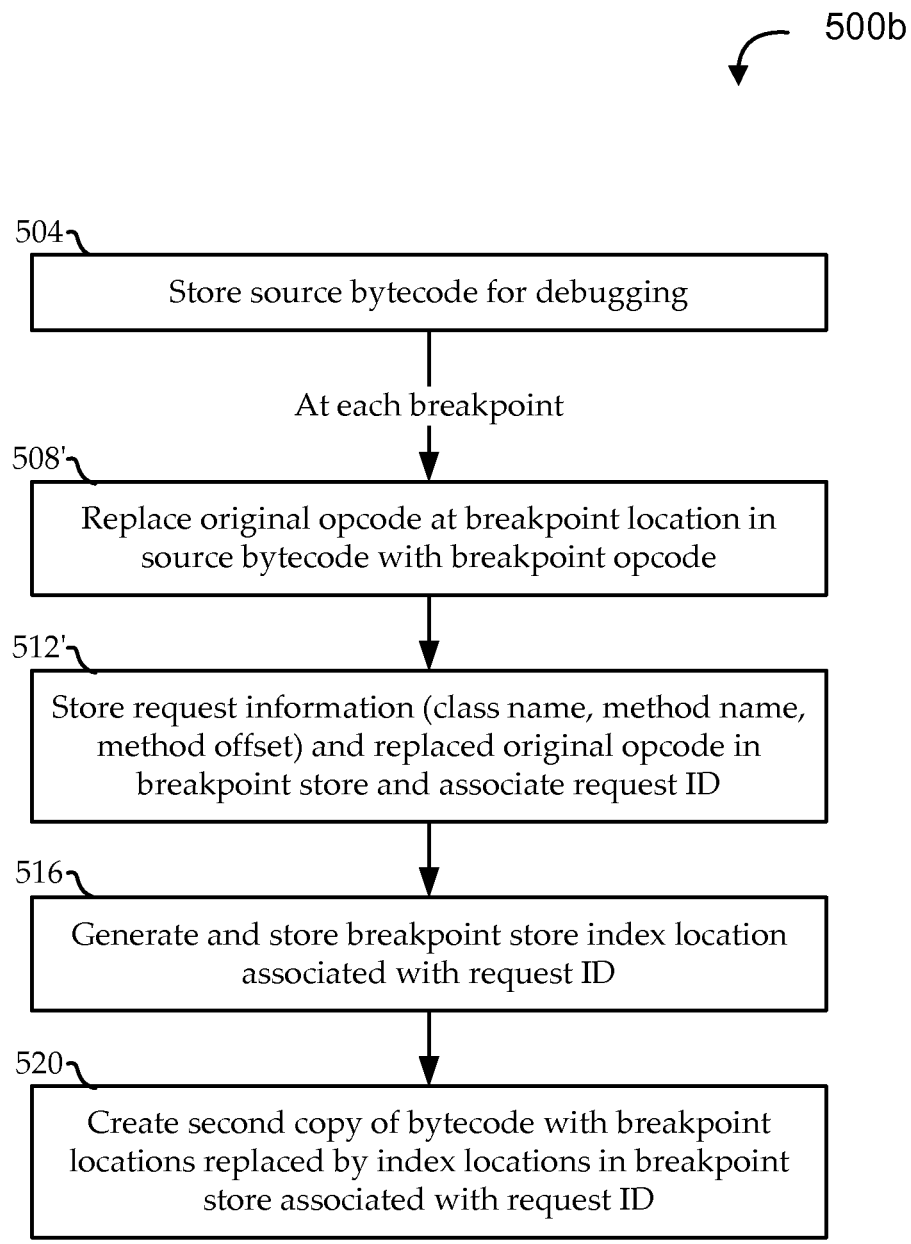
FIG. 5B shows a flow diagram for another illustrative method for implementing breakpoints in a debugger environment, according to various embodiments.

In some embodiments (e.g., as described with reference to FIG. 4B above), at block 524, the source opcodes at the breakpoint locations (e.g., the opcodes replaced in generating the modified bytecode copies) are stored in the breakpoint store data structure. For example, each replaced source opcode is stored at the index location in association with the request identifier for the breakpoint request that caused its replacement. In certain embodiments, at block 528, the original source bytecode is removed from debugger memory (e.g., from the virtual machine 390) so that only two copied (i.e., the two modified copies) are maintained.

Where it is desirable to maintain only two copies of the bytecode, other efficiencies may be introduced by avoiding making the first copy. For example, FIG. 5B shows a flow diagram for another illustrative method 500*b* for implementing breakpoints in a debugger environment, according to various embodiments. Embodiments of the method 500*b* begin, as in FIG. 5A, at block 504 by storing source bytecode for debugging.

At block 508', rather than making a first copy of the bytecode (as described with reference to block 508 of FIG. 5A), source opcodes at breakpoint locations are replaced in the source bytecode with a breakpoint opcode. As such, the revised source opcode may effectively operate as the "first copy" of FIG. 5A. At block 512', as in block 512 of FIG. 5A, request information relating to the breakpoint request (e.g., class name, method name, method offset, etc.) is stored in a breakpoint store data structure and associated with a request identifier corresponding to the breakpoint request. Unlike in block 512 of FIG. 5A, block 512' may further include storing the source opcodes (i.e., that were replaced in the source bytecode listing) for each breakpoint in the breakpoint store data structure and associated with a request identifier corresponding to the breakpoint request. For example, this added functionality of block 512' may be similar or identical to the functionality of block 524 of FIG. 5A.

Embodiments of the method 500b may proceed as described with reference to the method 500a of FIG. 5A. For example, when the request information is stored in the data structure, an index location is recorded in association with the request identifier at block 516. At block 520, a second copy of the source bytecode (i.e., or, more precisely, a first copy, since the source bytecode is being used in place of the other copy) may be created by replacing source opcodes at breakpoint locations with the index locations associated with request identifier corresponding to the breakpoint request.

Figure 6:
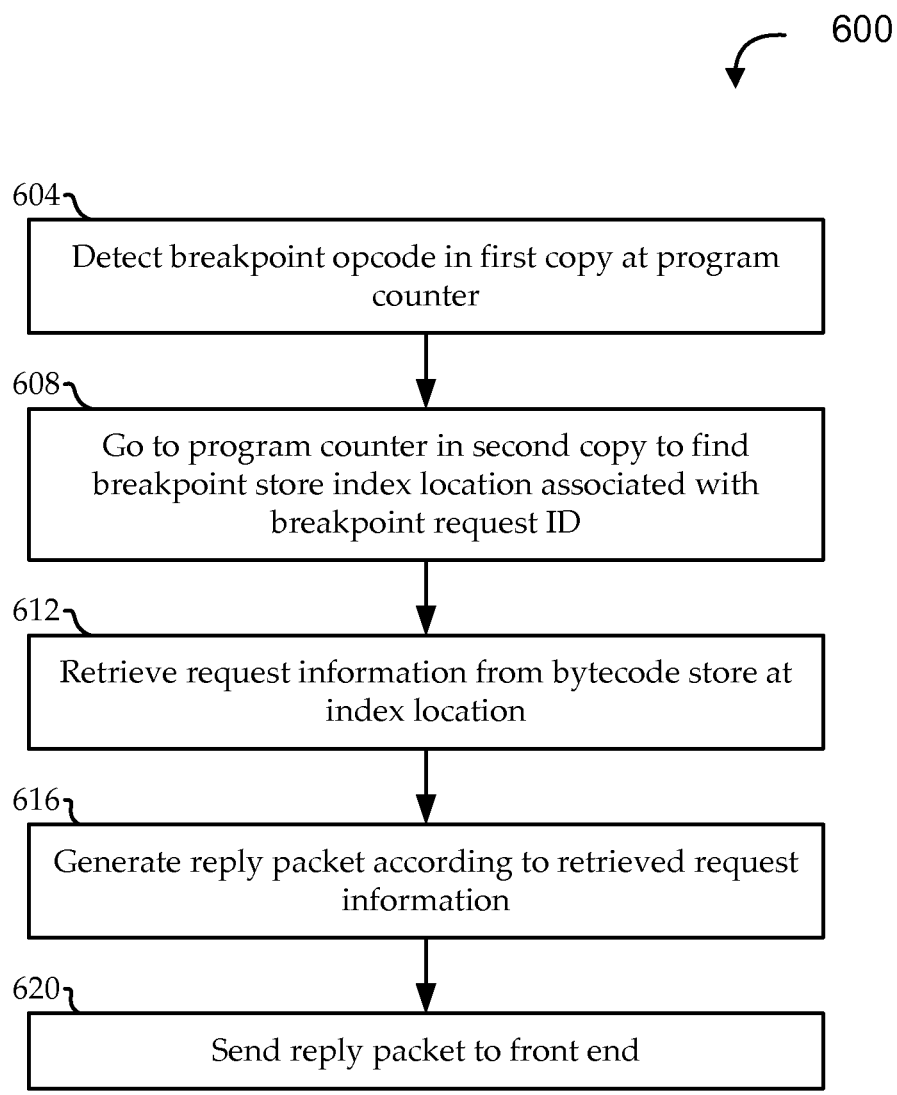
FIG. 6 shows a flow diagram of an illustrative method for handling encountered breakpoints in a debugger environment, according to various embodiments.

After the breakpoints have been implemented in the debugger environment, the debugger can execute the bytecode, including handling any breakpoints as the are encountered. FIG. 6 shows a flow diagram of an illustrative method 600 for handling encountered breakpoints in a debugger environment, according to various embodiments. It is assumed, in the context of FIG. 6, that two modified copies of the bytecode listing have been generated as described with reference to the method 500 of FIG. 5.

Embodiments of the method 600 begin at block 604 by detecting a breakpoint opcode in a first copy of the bytecode. For example, during debugger execution of the first copy of the bytecode, a breakpoint opcode is reached when the program is at a particular bytecode location (e.g., program counter). At block 608, the same program location (e.g., the same program counter) is located in a second copy to find an index location associated with breakpoint request identifier, as indicated by the second modified bytecode copy. As described above, the index location indicates a location within a breakpoint store data structure, in which breakpoint information is stored.

At block 612, request information is retrieved from the bytecode store at index location. For example, a class name, method name, method offset, etc. may be retrieved from the location associated with the request identifier. In some embodiments, the source opcode corresponding to the breakpoint location may also be stored in the breakpoint store and retrieved according to the index location.

The retrieved information (e.g., and/or other information, such as thread identifier, as discussed above) may be used at block 616 to generate a reply packet. The reply packet may then be sent to the debugger front-end at block 620. For example, the reply packet may be used to display relevant information for the requested breakpoint to a user via a front-end interface.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for implementing breakpoints in a computer-implemented debugger environment having a front-end system and a back-end system, the method comprising:
   receiving, by a computer system, a set of breakpoint requests at the back-end system from the front-end system, each breakpoint request indicating a request for setting a breakpoint at a program location in a source bytecode listing comprising a set of source opcodes stored in a bytecode data store;
   assigning, by the computer system, a request identifier for each breakpoint request using the back-end system;
   storing, by the computer system, in a breakpoint store communicatively coupled with the back-end system, a set of request objects for each breakpoint request in association with the corresponding request identifier;
   identifying, by the computer system, using the back-end system, for each breakpoint request, a locator indicating a location in the breakpoint store at which the corresponding request objects are stored in the breakpoint store;
   generating, by the computer system, a first modified bytecode copy using the back-end system by locating source opcodes in the source bytecode listing at the program locations corresponding to the breakpoint requests and replacing the located source opcodes in the first modified bytecode copy with breakpoint opcodes;
   generating, by the computer system, a second modified bytecode copy using the back-end system by replacing the located source opcodes in the second modified bytecode copy with the locator associated with each corresponding breakpoint request; and
   maintaining, by the computer system, the first modified bytecode copy and the second modified bytecode copy in the bytecode data store.

2. The method of claim 1, wherein storing the set of request objects for each breakpoint request in association with the corresponding request identifier comprises:
   storing a class name, a method name, and a method offset in the breakpoint store in association with the corresponding request identifier.

3. The method of claim 1, wherein storing the set of request objects for each breakpoint request in association with the corresponding request identifier comprises:
   storing in the breakpoint store in association with the request identifier for each breakpoint request, the source opcode located in the source bytecode listing at the program location corresponding to the breakpoint request.

4. The method of claim 3, further comprising:
   subsequent to storing the source opcodes from the program locations corresponding to the breakpoint requests in the breakpoint store, removing the source bytecode listing from the back-end data store.

5. The method of claim 1, wherein the first modified bytecode copy is generated in place of the source bytecode listing by replacing the located source opcodes with breakpoint opcodes in the source bytecode listing.

6. The method of claim 1, wherein:
   each set of request objects comprises an array of data objects, the array being indexable in the breakpoint store according to the locator.

7. A method for handling breakpoints in a computer-implemented debugger environment having a front-end system and a back-end system, the method comprising:
- identifying, by a computer system, using the back-end system, a program location corresponding to a breakpoint opcode encountered during execution of a first modified bytecode copy by the back-end system, the first modified bytecode copy generated by locating a source opcode located in a source bytecode listing at the program location corresponding to a breakpoint request received from the front-end system and replacing the located source opcode in the first modified bytecode copy with the breakpoint opcode;
- retrieving, by the computer system, a locator from a second modified bytecode copy, using the back-end system, according to the program location of the breakpoint opcode in the first modified bytecode copy, the second modified bytecode copy generated by the back-end system by locating the source opcode located in the source bytecode listing at the program location corresponding to the breakpoint request and replacing the located source opcode in the second modified bytecode copy with the locator, the locator corresponding to the breakpoint request;
- retrieving, by the computer system, using the back-end system, according to the locator, a set of request objects associated with the breakpoint request from a storage location in a breakpoint store corresponding to the locator, the breakpoint store being communicatively coupled with the back-end system;
- generating, by the computer system, using the back-end system, a reply packet corresponding to the breakpoint request and comprising the set of request objects; and
- communicating, by the computer system, the reply packet from the back-end system to the front-end system.

8. The method of claim 7, further comprising:
executing the first modified bytecode copy by the back-end system using a virtual machine.

9. The method of claim 7, further comprising:
- calculating a thread identifier associated with the breakpoint request by executing, using the back-end system, a function corresponding to the breakpoint opcode as a function of the program location where the breakpoint opcode is identified,
- the reply packet being generated to further comprise the thread identifier.

10. A computer-implemented debugging system comprising:
- a bytecode computer-readable storage subsystem, configured to maintain a source bytecode listing, a first modified bytecode copy, and a second modified bytecode copy;
- a front-end computerized subsystem configured to provide a debugger interface through which a user makes a plurality of breakpoint requests, each indicating a request for setting a breakpoint at a program location in the source bytecode listing comprising a set of source opcodes; and
- a computerized back-end subsystem, communicatively coupled with the front-end computerized subsystem and the bytecode computer-readable storage subsystem, and configured to:
  - receive the plurality of breakpoint requests from the front-end computerized subsystem;
  - assign a request identifier for each breakpoint request;
  - store, in a breakpoint store communicatively coupled with the computerized back-end subsystem, a set of request objects for each breakpoint request in association with the corresponding request identifier;
  - identify, for each breakpoint request, a locator indicating a location in the breakpoint store at which the corresponding request objects are stored;
  - generate the first modified bytecode copy in the bytecode computer-readable storage subsystem by locating a source opcode located in the source bytecode listing at the program location corresponding to each breakpoint request and replacing the located source opcode in the first modified bytecode copy with a breakpoint opcode; and
  - generate the second modified bytecode copy in the bytecode computer-readable storage subsystem by locating the source opcode located in the source bytecode listing at the program location corresponding to each breakpoint request and replacing the located source opcode in the second modified bytecode copy with the locator corresponding to the breakpoint request.

11. The computer-implemented debugging system of claim 10, wherein the back-end computerized subsystem is configured to store the set of request objects for each breakpoint request in association with the corresponding request identifier by:
storing a class name, a method name, and a method offset in the breakpoint store in association with the corresponding request identifier.

12. The computer-implemented debugging system of claim 10, wherein the computerized back-end subsystem is configured to store the set of request objects for each breakpoint request in association with the corresponding request identifier by:
storing, in the breakpoint store in association with the request identifier for each breakpoint request, the source opcode located in the source bytecode listing at the program location corresponding to the breakpoint request.

13. The computer-implemented debugging system of claim 12, wherein the computerized back-end subsystem is further configured to:
subsequent to storing the source opcodes from the program locations corresponding to the breakpoint requests in the breakpoint store, remove the source bytecode listing from the bytecode computer-readable storage subsystem.

14. The computer-implemented debugging system of claim 10, the computerized back-end subsystem further configured to:
- execute the first modified bytecode copy from the bytecode computer-readable storage subsystem;
- identify, during execution of the first modified bytecode copy, the program location corresponding to an instance of the breakpoint opcode associated with one of the breakpoint requests;
- retrieve the locator from the second modified bytecode copy according to the program location of the instance of the breakpoint opcode;
- retrieve the set of request objects associated with the breakpoint request from the location in the breakpoint store as a function of the locator;
- generate a reply packet corresponding to the breakpoint request and comprising the retrieved set of request objects; and
- communicate the reply packet from the computerized back-end system to the computerized front-end system.

15. The computer-implemented debugging system of claim 14, the computerized front-end subsystem further configured to:
- display breakpoint information to the user via the debugger interface according to the reply packet and in response to receiving the reply packet.

16. The computer-implemented debugging system of claim 14, the computerized back-end subsystem further configured to:
- calculate a thread identifier associated with the breakpoint request by executing a function corresponding to the breakpoint opcode as a function of the program location where the breakpoint opcode is identified,
- the reply packet being generated to further comprise the thread identifier.

17. The computer-implemented debugging system of claim 14, the computerized back-end subsystem configured to:
- execute the first modified bytecode copy from the bytecode storage subsystem using an instance of Java™ Virtual Machine (JVM).

18. The computer-implemented debugging system of claim 10, further comprising:
- the breakpoint store, configured to store a plurality of sets of request objects, each set of request objects associated with a request identifier corresponding to a respective breakpoint request, and comprising an array of data objects that is indexable in the breakpoint store according to the locator corresponding to the respective breakpoint request.

19. The computer-implemented debugging system of claim 10, further comprising:
- a memory subsystem, comprising the bytecode computer-readable storage subsystem and the breakpoint store.

20. The computer-implemented debugging system of claim 10, further comprising:
- a machine-readable storage medium having stored thereon a series of instructions which, when executed by a processor, cause the processor to direct operation of the computerized back-end subsystem.

\* \* \* \* \*

UNITED STATES PATENT AND TRADEMARK OFFICE
CERTIFICATE OF CORRECTION

PATENT NO. : 8,434,057 B2  
APPLICATION NO. : 12/857734  
DATED : April 30, 2013  
INVENTOR(S) : Ashish et al.

Page 1 of 1

It is certified that error appears in the above-identified patent and that said Letters Patent is hereby corrected as shown below:

On Title page 2, in column 1, Item [56] under "Other Publications", line 3, delete "DGB," and insert -- GDB, --, therefor.

On Title page 2, in column 2, Item [56] under "Other Publications", line 7, delete "JavaTM" and insert -- Java$^{TM}$ --, therefor.

Signed and Sealed this  
Third Day of September, 2013

Teresa Stanek Rea  
*Acting Director of the United States Patent and Trademark Office*